3,354,151
METHOD OF PREPARING 1β-METHYL-2,3α-METHYLENE-STEROIDS
Hans Müller and Friedmund Neumann, Berlin, and Rudolf Wiechert, Berlin-Wannsee, Germany, assignors to Schering A.G., Berlin, Germany
No Drawing. Filed Nov. 2, 1965, Ser. No. 506,111
Claims priority, application Germany, Dec. 5, 1964, Sch 36,207
2 Claims. (Cl. 260—239.55)

This invention relates to a method of preparing 1β-methyl-2,3α-methylene-steriods. It is known that 2,3-methylene-steriods such as 2,3α-methylene-17α-methyl-5α-androstan-17β-ol are good, orally effective anabolic agents. See German published patent application DAS 1,181,702.

It has been now found that the corresponding derivatives of 1β-methyl-2,3α-methylene-5α-androstane which were not described heretofore, are surprisingly superior when used in medical practice because their oral anabolic effect is at least equal to that of the known 1-desmethyl-2,3α-methylene-steroids, but the relationship of anabolic efficiency to androgenous side effects is substantially more favourable than in the afore-mentioned 1-desmethyl-compounds, as is evidenced by the following Table 1 with reference to 1β,17a - dimethyl-2,3α-methylene-5α-androstand -17β-ol as compared to the known, 2,3α-methylene-17α-methyl-5α-androstan-17β-ol, the anabolic effect having been determined by the known *levator ani* test, and the androgenous effect by the known seminal vesicle test in castrated rats after oral application.

TABLE 1

| Compound: 12× 3 mg. p.o. | Levator ani Wt. in mg./100 g. rat | Seminal vesicle Wt. in mg./100 g. rat |
|---|---|---|
| 1β,17α-dimethyl-2,3α-methylene-5α-androstan-17β-ol | 39 | 21 |
| 2,3α-methylene-17α-methyl-5α-androstan-17β-ol | 35 | 48 |

The orally applied medical compositions are prepared by combining the physiologically effective agents of the invention with carriers commonly employed in Galenic pharmacy in a known manner.

Several of the new 1β-methyl-2,3α-methylene-steroids, namely the 1β-methyl-17α-alkyl-2,3α-methylene-5α-androstan-17β-ols and their esters and ethers additionally have superior ovulation preventing effects as shown in the Table 2 below for the 1β,17α-dimethyl-2,3α-methylene-5α-androstan-17β-ol (Compound I) as compared to the known compounds II and III, the prevention of ovulation having been determined in normal female rats by the known tube inspection test after oral application, and the results are expressed as ED$_{50}$, the dosage at which ovulation failed to occur in 50% of the tested animals.

TABLE 2

| No. | Compound | ED$_{50}$ p.o., mg./animal/day (4 day's duration) |
|---|---|---|
| I | 1β,17α-dimethyl-2,3α-methylene-5α-androstan-17β-ol | 0.3–1 |
| II | 17α-ethinyl-19-nortestosterone | 3 |
| III | 6-chloro-Δ⁶-17α-hydroxyprogesterone-acetate | 1–3 |

In view of the foregoing the present invention thus relates to a method of preparing novel 1β-methyl-2,3α-methylene-steroids of the formula

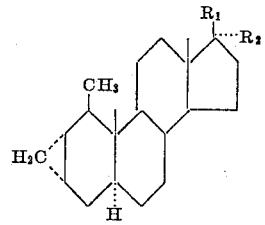

(A)

wherein $R_1$ is a free or functionally modified, preferably esterified or etherified hydroxyl group, and $R_2$ is hydrogen or a preferably lower saturated or unsaturated, straight-chained or branched alkyl radical, characterized by the face that the 2,3-double bond of a starting steroid of the formula

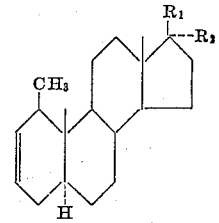

(B)

wherein $R_1$ and $R_2$ are as described above, is methylenated in a manner known in itself, and the primary product so obtained is subsequently acylated or etherified if so desired, or is subjected to saponification or ether splitting, or if $R_2$ is hydrogen in the starting material a 17β-hydroxyl group or its functionally modified derivative is converted after methylenation of the 2,3 double bond in a manner also known in itself into the 17β-$R_1$-17α-alkyl grouping, if so desired.

If it is desired to produce 17α-alkylated 1β-methyl-2,3α-methylene-5α-androstan-17β-ols, it is not absolutely necessary to start from the corresponding 17α-alkylated-Δ²-steroids. It is entirely possible to methylenate, for example, 1β-methyl-Δ²-5α-androsten-17β-ol that is, $R_1$=OH and $R_2$=H in the 2,3 position according to the method of the invention and thereafter to convert the 17β-hydroxyl grouping. This may be done for example, by oxidizing the 17β-hydroxyl group according to the method of German Patent No. 1,117,573, and by converting the 7-keto radical formed into the 17β-hydroxy-17-alkyl group by means of Grignard's reagent, or by introducing a 17α-ethinyl radical in an analogous manner, and subsequently hydrogenating the same.

The products of the method contain a free hydroxyl radical in position 17, and this radical may be functionally modified, if desired, preferably by esterification or etherification. Physiologically tolerated ester radicals may be obtained by combination with acid radicals, such as those of acetic acid, propionic acid, cyclopentylpropionic acid, caproic acid, oenanthic acid, benzoic acid, dichloroacetic acid, and the like. In view of the intended pharmaceutical application of the products of the invention, suitable ether radicals include, for example, the methyl, ethyl, tetrahydropyranyl radicals.

The 2,3α-methylenation which may be carried out according to known methods is preferably performed according to the method of the published German patent application DAS 1,181,702, by dissolving the steroid material which has a double bond in position 2,3 in a suitable solvent, such as diethyl ether, ethylene glycol dimethyl ether, tetrahydrofuran, and mixtures thereof, and subjecting the dissolved material to reaction with methylene iodide in the presence of a zinc-copper couple, preferabbly at an elevated reaction temperature.

Other than by the more favorable direct introduction of the 2,3-methylene radical, it is of course also possible to introduce the methylene group by any one of the multi-step methods known to those skilled in the art. One may, for example, react the double bond with trichloroacetic acid in the form of its sodium salt by analogy to the method of L. H. Knox, Chem. & Ind., 1962, 860, and may dehalogenate the 2,3α-dichloromethylene derivative obtained as a primary product by analogy to the method of G. L. Closs JACS, 82 (1960) 5723 by means of sodium in liquid ammonia, whereby the desired 1β-methyl-2,3α-methylenesteroid is obtained.

The following examples are intended to illustrate but not restrict the invention herein.

EXAMPLE 1

1β,17α-dimethyl-$\Delta^2$-5α-androsten-17β-ol, M.P. 147° C., was prepared according to known methods from 1β-methyl-5α-androstan-17β-ol-3-one-17-acetate (see "C–1 Monoalkylierte Steroide" by Alfred Popper, doctoral thesis, Technische Universitaet, Berlin, Germany, November 1, 1958) by reduction of the keto group, tosylating of the 3-ol group so formed, and tosylate splitting to the $\Delta^2$-compound, and subsequent 17-acetate saponification (M.P. 144° C.). The 17β-hydroxyl group of the intermediate so obtained was oxidized in a known manner, and the 17-ketone of M.P. 148° C. was subjected to Grignard's reaction.

3.0 g. of 1β,17α-dimethyl-$\Delta^2$-5α-androsten-17β-ol dissolved in 54 ml. of absolute diethyl ether and 6 ml. of absolute ethyleneglycol dimethyl ether were heated for six hours to 42° C. with 26.8 g., 8.0 ml., methylene iodide, a pinch of iodine, and 9.8 g. of zinc-copper couple. The reaction mixture was then cooled and filtered, and the residue of inorganic material was washed with ether. The ether solutions were washed sequentially with ammonium chloride solution, sodium thiosulfate solution, and water. The ether solution was then dried, the solvent was evaporated, and the residue was subjected to chromatography on silica gel containing 5% water with a 9:1 mixture of hexane and ethyl acetate. After evaporation of the solvent and recrystallization of the residue from ethyl ether, there were obtained 1.2 g. of 1β,17α-dimethyl-2,3α-methylene-5α-androstan-17β-ol having a melting point of 144.5–145.5° C.

EXAMPLE 2

907 mg. of 1β,17α-dimethyl-$\Delta^2$-5α-androsten-17β-ol were dissolved in 22.5 ml. diethyleneglycol dimethylether, and 2.224 g. of sodium trichloroacetate were added to the solution in small batches over a period of about 1½ hours while the solution was being stirred under a nitrogen atmosphere at 120° C. The reaction mixture was left to stand about 40 hours at room temperature, whereupon it was diluted with water and extracted with ether. The ether phase was dried and evaporated, and the residue was subjected to chromatography on silica gel with hexane-acetone 4:1. 180 mg. of crude 1β,17α-dimethyl-2,3α-dichloromethylene-5α-androstan-17β-ol were obtained; Cl found=18.64%; Cl calculated=18.40%, were dissolved in 12 ml. of absolute ether without further purification, and were added dropwise to a solution of 1.5 g. of sodium in 35 ml. of liquid ammonia cooled to −75° C. The reaction mixture was stirred one hour at −70° C., whereupon 1.5 g. of ammonium chloride were added, and stirring was continued at room temperature. After about 20 hours, the residue was taken up in ether, and the ether phase was washed with water until neutral. The ether solution was dried and evaporated to dryness, and the residue obtained was recrystallized from ether. 75 mg. of 1β,17α - dimethyl-2,3α-methylene-5α-androstan-17β-ol of M.P. 144–145° C. were obtained.

EXAMPLE 3

3.7 g. of 1β-methyl-$\Delta^2$-5α-androsten-17β-ol-tetrahydropyranylether, M.P. 60° C., obtained from the free 17β-OH compound of M.P. 144° C. by ether formation with dihydropyran in a known manner, dissolved in 54 ml. of absolute ether and 6 ml. of absolute ethyleneglycol dimethylether were reacted with 26.8 g., 8.0 ml., of methylene iodide, a spatula tip full of iodine and 9.8 g. of zinc copper couple as in Example 1, and worked up. There were obtained 1.6 g. of 1β-methyl-2,3α-methylene-5α-androstan-17β-ol-17-tetrahydropyranylether.

EXAMPLE 4

In the manner of Example 1, about 0.6 g. of 1β-methyl-17α-ethinyl-2,3α-methylene-5α-androstan-17β-ol were obtained from 3.1 g. of 1β-methyl-17α-ethinyl-$\Delta^2$-5α-androsten-17β-ol, M.P. 119° C., prepared from the 17-ketone of M.P. 148° C., described according to Example 1 by means, for example of ethinylmagnesium bromide.

EXAMPLE 5

3.3 g. of 1β-methyl-$\Delta^2$-5α-androsten-17β-ol-17-acetate, M.P. 140° C., prepared from 1β-methyl-5α-androstan-17β-ol-3-one —17-acetate by known methods, for example, by reduction or hydrogenation of the keto group, tosylating of the 3-ol group formed, and subsequent tosylate splitting to the $\Delta^2$-compound, dissolved in 54 ml. of absolute diethyl ether and 6 ml. of ethyleneglycol dimethylether are heated for 3 days to 42° C. with 26.8 g., 8.0 ml., of methylene iodide, a spatula tip full of iodine, and 9.8 g. of zinc-copper couple. The ether solution obtained by filtration and washing of the inorganic residue, is washed wtih ammonium chloride solution, sodium thiosulfate solution and water.

After drying and evaporation of the solvent, the residue is subjected to chromatography over silica gel with a solvent mixture of 9 parts hexane and 1 part ethyl acetate. There are obtained 2.2 g. of 1β-methyl-2,3α-methylene-5α-androstan-17β-ol-acetate as an oil.

EXAMPLE 6

2.9 g. of 1β-methyl-$\Delta^2$-5α-androsten-17β-ol, M.P. 144° C., obtained by saponification of the 17-acetate are reacted according to Example 5 and worked up. After recrystallization from pentane-diisopropylether, there are obtained 2.1 g. of 1β-methyl-2,3α-methylene-5α-androsten-17β-ol of melting point 128–129.5° C.

The same compound is also obtained by saponification of the corresponding 17-acetate prepared according to Example 5.

We claim:
1. 1β - methyl - 17α - ethinyl - 2,3α - methylene - 5α-androstan-17β-ol.
2. 1β - methyl - 2,3α - methylene - 5α - androstan - 17β-ol-17-tetrahydropyranylether.

References Cited

UNITED STATES PATENTS 3,032,552   5/1962   Ringold et al. _____ 260—239.55
3,324,152   6/1967   Muller et al. _____ 260—397.5

OTHER REFERENCES

Wolff et al., J. Med. Chem., 7, pages 577–583 (1964). (Pages 577–580 and 583 relied on.)

LEWIS GOTTS, Primary Examiner.

ELBERT L. ROBERTS, Examiner.

T. M. MESHBESHER, Assistant Examiner.